United States Patent [19]

Lunder et al.

[11] Patent Number: 4,490,402
[45] Date of Patent: Dec. 25, 1984

[54] PROCESS FOR PREPARING COLD SOLUBLE TEA PRODUCT

[75] Inventors: Tito L. Lunder; Corine M. Nielsen, both of Lausanne, Switzerland

[73] Assignee: Societe d'Assistance Technique Pour Produits Nestle S. A., Lausanne, Switzerland

[21] Appl. No.: 472,006

[22] Filed: Mar. 4, 1983

Related U.S. Application Data

[63] Continuation-in-part of Ser. No. 447,164, Dec. 6, 1982, abandoned.

[51] Int. Cl.$^3$ ............................................... A23F 3/18
[52] U.S. Cl. .................................... 426/422; 426/435; 426/597
[58] Field of Search .......................... 426/435, 597, 422

[56] References Cited

U.S. PATENT DOCUMENTS

| | | | |
|---|---|---|---|
| 2,235,700 | 3/1941 | Eldred | 426/597 |
| 2,785,979 | 3/1957 | Mitchell | 426/597 |
| 4,130,669 | 12/1978 | Gregg | 426/597 X |
| 4,410,556 | 10/1983 | Lunder et al. | 426/435 X |

FOREIGN PATENT DOCUMENTS

| | | | |
|---|---|---|---|
| 120417 | 10/1945 | Australia | 426/597 |
| 553800 | 6/1932 | Fed. Rep. of Germany | 426/422 |
| 559758 | 3/1944 | United Kingdom | 426/597 |
| 1284721 | 8/1979 | United Kingdom | 426/597 |

OTHER PUBLICATIONS

Punnett, What Causes 'Clouding' in Iced Tea?, Tea & Coffee Trade Journal, May 1956, pp. 17, 86, 87.

*Primary Examiner*—Joseph Golian
*Attorney, Agent, or Firm*—Vogt & O'Donnell

[57] ABSTRACT

A process for preparing a powdered tea extract wherein black tea leaves are macerated with water, the macerated leaves are extracted first with cold water and then with hot water after which the cold and hot extracts are mixed before being concentrated and dried.

11 Claims, No Drawings

PROCESS FOR PREPARING COLD SOLUBLE TEA PRODUCT

This is a continuation-in-part of application Ser. No. 447,164, filed Dec. 6, 1982, now abandoned, the contents of which are incorporated herein by reference.

The present invention relates to the production of a cold soluble tea product and more particularly to a powdered tea extract which is readily and completely soluble in cold water.

The traditional methods of producing instant tea, which usually consist of the steps of extraction, aroma processing, dehazing and drying, do not give cold soluble powders. The achievement of cold-water solubility necessitates some additional processing of the extracted tea which contains a considerable amount of cold-water insoluble material formed by tea cream and polymers of polyphenols. This additional processing may involve cooling the hot aqueous tea extract to precipitate the cold-water insoluble material or it may involve the solubilisation of the cold-water insoluble material by chemicals or enzymes. However, in the former method, there is a loss of up to about 10% of the total tea solids if the precipitated proportion is discarded, and in the latter method the reconstituted beverage is very foamy and has exceedingly poor stability, palatability and drinking properties.

One method of producing a cold soluble tea extract which does not involve the use of any additives is described in British Pat. No. 559,758. In this method, a cold extract of dry tea is made at a temperature between 10° and 25° C., and then the same tea leaves are used again for the preparation of a hot infusion with water which is boiling or nearly boiling, both extracts are dehydrated so as to produce semi-liquid or solid extracts which are blended in desired proportions. However, a disadvantage of such a method is that the time required for the cold water extraction is stated to be quite long, for instance from 4 to 24 hours. Such extraction times are not economically feasible.

We have now found that a cold soluble tea powder may be prepared from tea leaves by a very simple process without using chemicals or enzymes which involves a maceration, a cold-water extraction and then a hot-water extraction during which process a cold-water extraction time of more than 4 hours is unnecessary and neither tea cream formation nor the polymerisation of polyphenols occurs.

Accordingly, the present invention provides a process for preparing a powdered tea extract in which black tea leaves are macerated with water, the macerated leaves are extracted first with cold water and then with hot water after which the cold and hot extracts are mixed before being concentrated and dried.

The process of this invention may be applied to all kinds of black tea and their blends.

The maceration of the tea leaves may be carried out in either cold or warm water, for instance from 15° to 40° C. preferably from 20° C. to 35° C. The duration of the maceration should be sufficient to obtain a good wetting of the tea leaves and is usually at least 20 minutes, for instance from 40 to 150 minutes and advantageously from 50 to 130 minutes. Periods longer than 150 minutes may be used but are unnecessary as they do not produce any improvement in the final product. Conveniently, the maceration may be carried out at ambient temperature, for example, from 20° C. to 30° C. The maceration step softens and swells the tea leaves making extraction in cold water easier and more productive. The water is advantageously deionized water. The amount of water used for the maceration may be from 0.5 to 10 parts by weight, conveniently from 1 to 5 parts by weight and preferably from 1.5 to 3.5 parts by weight per part by weight of tea leaves.

The macerated leaves are then extracted either batchwise or countercurrently. Batchwise extraction is preferably carried out with agitation such as stirring in a vessel which contains water and the tea leaves. In a countercurrent process the water flows countercurrently through a plurality of cells containing the tea leaves.

In the extraction with cold water, the water may be at a temperature from 10° C. to 40° C., preferably from 15° C. to 35° C. and especially from 20° C. to 30° C. The duration of the cold extraction may be up to 2 hours, for instance from 2.5 to 90 minutes, conveniently from 4 to 80 minutes. In both countercurrent and batchwise processes, the duration of the extraction is suitably from 5 to 45 minutes and preferably from 7.5 to 35 minutes although in a batchwise process the duration of the extraction may be extended if desired to from 50 to 75 minutes. The water is advantageously deionized water. The amount of water used for the cold extraction may be from 2 to 50 parts by weight, conveniently from 5 to 30 parts by weight and preferably from 7.5 to 25 parts by weight per part by weight of tea leaves. After the extraction, the cold extract is separated from the tea leaves.

In the extraction with hot water, the water may be at a temperature from 60° C. to 100° C. preferably from 65° C. to 97.5° C. and especially from 70° C. to 95° C. The duration of the hot extraction may be up to 15 minutes, conveniently from 2.5 to 12.5 minutes and preferably from 5 to 11 minutes. The amount of water used for the hot extraction may be from 2 to 50 parts by weight, conveniently from 5 to 30 parts by weight and preferably from 7.5 to 25 parts by weight per part by weight of tea leaves. Conveniently the amount of water used for the hot extraction is approximately the same as the amount used for the cold extraction. In a batchwise process the hot water may conveniently be poured onto the tea leaves while in a countercurrent process the hot water conveniently flows through a plurality of cells containing tea leaves which have previously been extracted with cold water. After the hot extraction the extract is separated from the tea leaves.

The manner of separation of the extract from the tea leaves after both the cold extraction and the hot extraction depends on whether the process is batchwise or countercurrent. In a batchwise process the separation may suitably be carried out by filtering or centrifuging while in a countercurrent process the separation may be achieved by drawing off the extract from the cell containing the least exhausted tea leaves.

Advantageously, the separated hot extract is treated with activated charcoal before being mixed with the cold extract. For example, the activated charcoal may be added to the extract in an amount from 2% to 50% by weight, preferably from 5% to 30% by weight and especially from 10% to 20% by weight based on the weight of dry tea leaves and the mixture agitated, for instance by stirring, for a suitable period of time, conveniently from 5 to 20 minutes, before separating the hot extract from the charcoal, for example, by filtering or centrifuging. Alternatively, the hot extract may be forced through a column containing the activated charcoal, the amount of charcoal being sufficient to ensure a contact time with the hot extract of from, for example, 1 to 60 minutes, preferably 5 to 30 minutes and especially from 10 to 15 minutes.

By means of this treatment with activated charcoal, the prevention of the formation of cold-water insoluble material formed by tea cream and polymers of polyphenols is further improved.

The activated charcoal may be washed with hot water to minimise losses of solids and it may be regenerated, for instance by heating or solvent washing.

The cold and hot extracts are then mixed and generally the extracts are concentrated to a desired solids content before drying, for example, by freeze-drying or spray-drying.

The powdered extract may be mixed with of the ingredients usually employed in tea preparations, for example, sucrose, glucose, citric acid, tartaric acid, flavours and anti-caking agents.

The powdered extract obtained in accordance with the present invention is instantly soluble in cold water at 15°–20° C. which can then be iced and provides beverages having good stability, palatability and drinking qualities.

The following Examples further illustrate the present invention.

EXAMPLE 1

20 kg of deionised water at 25° C. were poured into a vessel containing 10 kg black tea leaves which were then allowed to macerate for 60 minutes. Afterwards 200 liters of deionized water at 25° C. were poured onto the macerated tea leaves and the mixture extracted with stirring for 10 minutes. The cold extract was then separated by centrifugation. 200 liters of deionized water at 85° C. were then poured onto the spent leaves from which the cold extract had been separated and the mixture extracted for 10 minutes. The hot extract was then separated by centrifugation. The cold extract and the hot extract were mixed together and flowed to an evaporator. The mixed extract was then concentrated and finally spray dried to give a powdered extract which was instantly soluble in cold water.

EXAMPLE 2

By following a similar procedure to that described in Example 1 but macerating 10 kg black tea leaves with 30 Kg of deionized water instead of 20 kg there used for a period of 120 minutes instead of 60 minutes, a powdered extract was obtained which was instantly soluble in cold water.

EXAMPLE 3

By following a similar procedure to that described in Example 1 but extracting with cold water for 60 minutes instead of 10 minutes, a powdered extract was produced which was instantly soluble in cold water.

EXAMPLE 4

By following a similar procedure to that described in Example 1 but using 100 liters of water both for the cold and hot extractions instead of 200 liters there used, a powdered extract was produced which was instantly soluble in cold water.

EXAMPLE 5

25 kg of deionized water at 25° C. were poured into a vessel containing 10 kg of black tea leaves which were then allowed to macerate for 90 minutes. Afterwards 150 liters of deionized water at 25° C. were poured onto the macerated tea leaves and the mixture extracted with stirring for 30 minutes. The cold extract was then separated by filtration.

150 liters of boiling deionised water were then poured onto the spent leaves from which the cold extract had been separated and the mixture extracted for 10 minutes. The hot extract ws then separated by filtration and to the hot extract was added 15% by weight of activated charcoal based on the weight of dry tea leaves. The mixture was stirred for 10 minutes and then filtered. The cold extract was mixed with the hot extract separated from the charcoal, concentrated to a suitable solids content and finally spray-dried to give a powdered extract which was instantly soluble in cold water.

COMPARATIVE EXAMPLE A 10 kg of black tea leaves which had not been macerated were extracted with 200 liters of deionized water at 25° C. with stirring for 10 minutes and the cold extract separated by filtration. 200 liters of deionised water at 85° C. were then poured onto the spent leaves and the mixture extracted for 10 minutes after which the hot extract was separated by filtration. The two extracts were dehydrated to powders which were then mixed. However, the resultant mixture was not completely soluble in cold water.

COMPARATIVE EXAMPLE B

A similar procedure was followed to that described in Comparative Example A except that the hot and cold extracts were mixed before being dehydrated to a powder. The resultant powder was not completely soluble in cold water.

COMPARATIVE EXAMPLE C

A similar procedure to that described in Comparative Example A was followed except that the duration of the cold extraction was 4 hours instead of 10 minutes. The resultant mixture was not completely soluble in cold water.

We claim:

1. A process for preparing a powdered tea extract characterized in that black tea leaves are macerated with a sufficient amount of water to wet, soften and swell the tea leaves at a temperature of from 15° C. to 40° C. for a period of at least 20 minutes, the macerated leaves are extracted first with at least 2 parts cold water per part by weight of tea leaves for a period of from 2.5 minutes to 2 hours at a temperature of from 10° C. to 40° C., and then with hot water for at least 2.5 minutes at a temperature of at least 60° C. after which the cold and hot extracts are mixed before being concentrated and dried.

2. A process according to claim 1 characterized in that the duration of the maceration is from 40 to 150 minutes.

3. A process according to claim 1 characterized in that the amount of water used for the maceration is from 1.5 to 3.5 parts by weight per part by weight of tea leaves.

4. A process according to claim 1 characterized in that the duration of the cold water extraction is from 7.5 to 35 minutes.

5. A process according to claim 1 characterized in that the amount of water used for the cold extraction is from 7.5 to 25 parts by weight per part by weight of tea leaves.

6. A process according to claim 1 characterized in that the temperature of the water for the hot extraction is from 60° C. to 100° C.

7. A process according to claim 1 characterized in that the duration of the hot extraction is from 5 to 11 minutes.

8. A process according to claim 1 characterized in that the amount of water used for the hot extraction is from 7.5 to 25 parts by weight per part by weight of tea leaves.

9. A process according to claim 1 characterized in that the hot extract, after being separated from the tea leaves, is treated with activated charcoal before being mixed with the cold extract.

10. A process according to claim 1 characterized in that the cold and hot extracts are mixed immediately before they are concentrated.

11. A process according to claim 1 characterized in that the water used for maceration and both extractions is deionized water.

* * * * *